United States Patent [19]

Bentley et al.

[11] Patent Number: 4,758,606

[45] Date of Patent: Jul. 19, 1988

[54] POLYESTER POLYOLS PREPARED BY REACTING A POLYHYDRIC ALKOXYLATED DERIVATIVE WITH A POLYCARBOXYLIC ACID

[75] Inventors: James M. Bentley, Wezembeek-Oppem; James P. Brown, Sterrebeek; William G. Carroll, Vossem, all of Belgium

[73] Assignee: Imperial Chemical Industries PLC, London, England

[21] Appl. No.: 822,132

[22] Filed: Jan. 24, 1986

[30] Foreign Application Priority Data

Feb. 18, 1985 [GB] United Kingdom ............ 8504096

[51] Int. Cl.$^4$ .................... C08G 18/00; C08G 18/28; C08G 63/66
[52] U.S. Cl. ........................ 521/172; 528/73; 528/300; 528/308; 528/308.6
[58] Field of Search .................. 528/300, 308, 308.6, 528/73; 521/172

[56] References Cited

U.S. PATENT DOCUMENTS

| | | | |
|---|---|---|---|
| 2,945,008 | 7/1960 | Caldwell et al. | 528/300 |
| 3,267,084 | 8/1966 | Rankin et al. | 528/308 |
| 3,287,319 | 11/1966 | Lerer | 528/308 |
| 3,287,419 | 11/1966 | Duke et al. | 528/308.6 |
| 3,412,069 | 11/1968 | Rice et al. | 528/308 |
| 3,860,611 | 1/1975 | Krespan | 528/73 |
| 4,590,226 | 5/1986 | Brown et al. | 528/73 |

Primary Examiner—Harold D. Anderson
Assistant Examiner—Dennis R. Daley
Attorney, Agent, or Firm—Cushman, Darby & Cushman

[57] ABSTRACT

A polyester polyol derived from a polyalkoxylated by-product of pentaerythritol manufacture and polycarboxylic acids, the latter being themselves by-products from the production of adipic acid or terephthalic acid or derivatives thereof, useful for the manufacture of rigid foam.

9 Claims, No Drawings

POLYESTER POLYOLS PREPARED BY REACTING A POLYHYDRIC ALKOXYLATED DERIVATIVE WITH A POLYCARBOXYLIC ACID

The invention relates to polyester polyols of a defined type, to their manufacture by esterification or transesterifcation of polyether polyols also of a defined type, with certain polybasic acid species and their conversion to polyurethanes by reaction with polyisocyanates.

The starting polyether polyols to be used in the invention are described in U.S. Pat. No. 4,590,226, which subject matter is hereby incorporated by reference. This patent application discloses polyether polyols having an average hydroxyl value in the range 400–650 mg KOH/g and preferably 490–575 mg KOH/g, which are alkoxylated derivatives of a polyhydric alcohol, itself being a single compound or a mixture of compounds according to the general formula (I) below:

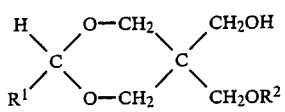

wherein
$R^1$ is —H, —CH$_3$, or —OCH$_3$
$R^2$ is —H, —CH$_2$OH, or —CH$_2$C(CH$_2$OH)$_3$ Where a polyhydric alcohol is present, other than one of the type defined above, it is preferably incorporated into the composition such that after alkoxylation the alkoxylated derivative forms at least 5% by weight of the polyether polyol composition and the polyhydric alcohol has the general formula (II) or is a mixture of compounds of that formula.

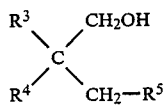

wherein $R^3$ and $R^4$, which may be the same or different, are selected from —H, —CH$_2$OH and —CH$_2$OCH$_3$ provided that only one of $R^3$ or $R^4$ may be —CH$_2$OCH$_3$, $R^5$ is —OH, —OCH$_2$OH or —OCH$_2$C(CH$_2$OH)$_3$.

Thus a preferred polyether polyol comprises 10 to 95% of oxyalkylated polyhydric alcohols according to formula I and 5 to 50% of oxyalkylated polyhydric alcohols according to formula (II).

The alkoxylation agent could be propylene oxide, ethylene oxide or butylene oxide or mixtures thereof.

It has now been found unexpectedly that some polyester derivatives of the above polyols provide new polyols of improved processability suitable for the manufacture of rigid polyurethane foams of fine cell-structure.

Economy has also become a critical factor in the rigid foam business and accordingly, another main advantage resulting from the present invention is that the polyols are manufactured from two readily available starting components. The latter are indeed waste byproducts from the manufacture of pentaerythritol on one side and adipic acid or terephthalic acid or derivatives thereof on the other side.

The polybasic acid species used in the preparation of the polyester polyols of the invention include:

(a) aliphatic dibasic acids or esters of the type ROOC(CH$_2$)n COOR wherein n=2 to 8 and R is H, methyl or ethyl or mixtures thereof, preferably mixtures of adipic, glutaric and succinic acids or derivatives thereof, (b) aromatic dibasic acids of the general formula

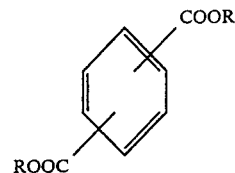

wherein R is H, methyl or ethyl and carboxyl groups are in the ortho, meta or para positions relative to each other or mixtures thereof, preferably dimethyl terephthalate or distillation residues therefrom, residues from polyethylene terephthalate (PET) manufacture or product from the recycle of PET waste, (c) other aromatic polybasic acids such as benzenetricarboxylic acids or polycarboxy substituted diphenyls and polyphenyls and the corresponding methyl esters.

Tetrabutyl-o-titanate was used for this invention and is a known catalyst for esterification/transesterification reactions; other catalysts could include stannous octoate or p-toluene sulphonic acid.

The polyester polyol of the present invention, with an average hydroxyl value in the range 250 to 400 mg KOH/g and with a weight average functionality in the range 2.3 to 5, may be used in admixture with known polyether polyols, polyester polyols or polyesteramide polyols.

The present invention includes also the manufacture of polyurethane products, for example polyurethane foams, in known manner, from the polyester polyols described above, and also includes polyurethane products so prepared.

Polyurethane products are made by reacting a di- or polyisocyanate with the described polyester polyol. The nature of the polyurethane product, for example the polyurethane foam may be varied depending on a variety of factors such as the functionality of the reactants and the presence of active ingredients.

The organic di- or polyisocyanates may be any of the isocyanates known to be useful for the formation of polyurethane products such as polyurethane foams. Of particular interest are aromatic di- or polyisocyanates, for example tolylene diisocyanate and especially diphenylmethane diisocyanate (MDI) which are commercialy available in a variety of forms. Suitable diphenylmethane di-isocyanates include (a) diphenylmethane 4,4' diisocyanate and mixtures thereof with other isomers of diphenylmethane diisocyanate;

(b) methylene bridged polyphenylpolyisocyanates prepared by phosgenation of mixtures of appropriate polyamines obtained by the condensation of aniline and formaldehyde and known as 'polymeric' MDI, the composition of which may subsequently be varied by distillation, crystallisation or other separation techniques to give products with a weight average functionality in the range 2 to at least 3.3;

(c) polymers and oligomers obtained by reacting diphenylmethane diisocyanates or polymeric MDI with a monomeric glycol or polyhydric alcohol (or mixtures thereof) or with a hydroxyl-ended polyester or polyether and known as 'MDI prepolymers'; and (d) modified diphenylmethane diisocyanates or 'polymeric MDI' in which a proportion of the isocyanate groups are converted into other groups such as carbodiimide, uretoneimine, biuret or allophanate groups, or in which a proportion of the isocyanate groups are reacted with an isocyanate-reactive compound.

The preparation of the foamed polyurethane materials may be carried out by the general methods fully described elsewhere. Thus the foam forming components may be mixed continuously or discontinuously in the presence of the gas generating agent to give a foam.

The foam forming gas may be generated by a variety of methods. For example the gas may be carbon dioxide generated by the reaction of a proportion of the organic isocyanate with water incorporated in the reaction mixture. Gas may also be generated by incorporating in the reaction mixture an inert liquid of low boiling point which vaporises during the exothermic polyurethane foaming reaction. Mixtures of water with inert low boiling point liquids may be used if desired. Examples of such liquids are halogenated hydrocarbons such as methylene chloride, halomethanes and haloethanes. Mixtures of these low boiling point liquids one with another and/or with other substituted or unsubstituted hydrocarbons may also be used. Such liquids are usually employed in amounts of from 5% to 50% by weight of the polyester polyol.

Water is usually employed in amounts of from 1% to 10% by weight of the polyester when used as a gas generating agent.

Catalysts for the polyurethane forming reaction may also be included, especially tertiary-amines, basic compounds and metal compounds. Foam stabilisers such as siloxane alkoxy-ether copolymers may be present, together with additives such as pigments, flame retardants, fillers, chain extenders, crosslinking agents, plasticisers and anti-oxidants, each being used alone or in combination with the other additives.

Examples of the polyester polyols prepared according to the present invention are given below but could also include use of adipic acid, dimethyl terephthalate and the starting polyether polyols could also be prepared solely using ethylene oxide or mixture of ethylene-oxide/propylene oxide both by sequential or concurrent addition.

The invention is thus illustrated but not limited by the following examples.

EXAMPLE 1

5555 parts by weight of a propoxylated polyether polyol A prepared from residues of pentaerythritol manufacture as defined for the example s 1-3 of U.S. Pat. No. 4,590,226 and incorporated herein by reference and propylene oxide to hydroxyl value of 604 mg KOH/g, the residual catalyst being removed by ion exchange before dehydration, were charged to a 7.7 l stainless steel reactor with 1777 parts by weight of mixed dimethyl ester of adipic, glutaric and succinic acids (in the ratio A:G:S of 20:60:20). 0.29 parts by weight of tetrabutyl-o-titanate were also added. A nitrogen sparge was established through the reactor contents at a rate of 62 l/h with agitation. The reactor was fitted with a reflux/fractionation column packed with 5 mm ceramic Raschig rings. Vapour from the top of the column passed through an air/water condenser system to a suitable calibrated receiver. The reactor contents were heated to 200–210 deg C. at which temperature, methanol commenced distilling from the column top. 650 parts total distillate were recovered over 6 h during which time the reactor contents had reached 230 deg C.; the column head temperature remained constant at 60–65 deg C. When the column tops temperature fell to <30 deg C., the column was removed from the reactor and sparging continued via a side arm on the reactor top at a reactor temperature of 230 deg C. for 30 min and any distillate traces collected via a water condenser. The product (C) was then cooled to <100 deg C. by applying cooling water to the reactor coil and discharged from the reactor. The product had the analysis: hydroxyl value 325 mg KOH/g, acid value 0.17 mg KOH/g, viscosity at 100 deg C. of 145 centistokes and a methoxyl content of 0.52% as methanol.

EXAMPLE 2

6329 parts by weight of a polyether polyol (B) prepared from pentaerythritol residues and propylene oxide (see U.S. Pat. No. 4,590,226 such preparation of polyether polyol being incorporated herein by reference) to a hydroxyl value of 545 mg KOH/g, the residual catalyst being removed by ion exchange before dehydration, were charged to a 7.7 l stainless steel reactor with 1805 parts by weight of mixed dimethyl esters in Example 1 and 0.320 parts by weight of tetra butyl-o-titanate. The experimental procedure followed that as in Example 1. 700 parts total distillate was collected over 6 h. The final product (D), afetr 2 hours on side arm distillation, had the following analysis: hydroxyl value 290 mg KOH/g, acid value 0.15 mg KOH/g, viscosity at 100 deg C. of 69 centistokes and methoxyl content of 0.37% as methanol.

EXAMPLES 3-7

(see Table)

The prepared polyester polyols from Examples 1 to 2 above (C, D) were co-blended with (a) their based polyether polyols (A and B) respectively or (b) polyether polyol (E), a high functional sucrose amine product of hydroxyl value 575 mg KOH/g or (c) a combination of (a) or (b) as detailed in the Table.

The average hydroxyl value of the polyol blend is mentioned.

The polyurethane rigid foams, made from the polyester polyol blends and their parent polyether polyol or sucrose-amine polyether or mixtures thereof, are also described in Examples 3 to 7 in the Table.

TABLE

| EXAMPLE | 3 | 4 | 5 | 6 | 7 |
|---|---|---|---|---|---|
| Polyether Polyol A Ex. 1 | 18.98 | | 13.61 | | |
| Polyether Polyol B Ex. 2 | | | | | 14.12 |
| Polyester C Ex. 1 | 18.98 | 18.99 | 13.61 | | |
| Polyester D Ex. 2 | | | | 19.27 | 14.12 |
| Polyether polyol E | | 18.99 | 9.07 | 19.27 | 9.41 |
| OH value | 465 | 450 | 490 | 430 | 460 |
| DMMP | 3.00 | 3.00 | 3.00 | 3.00 | 3.00 |
| Silicone B8406 | 0.50 | 0.50 | 0.50 | 0.50 | 0.50 |
| Catalyst SFC | 0.55 | 0.90 | 0.60 | 1.50 | 1.25 |
| DBTDL | 0.005 | 0.010 | 0.0075 | 0.015 | 0.010 |
| Arcton II | 13.00 | 13.00 | 13.00 | 13.00 | 13.00 |
| Suprasec DNR | 45.04 | 44.61 | 46.60 | 43,45 | 44.59 |
| Index | 105 | 105 | 105 | 105 | 105 |
| Cream Time sec | 17 | 13 | 16 | 12 | 14 |

TABLE-continued

| EXAMPLE | 3 | 4 | 5 | 6 | 7 |
|---|---|---|---|---|---|
| String Time | 37 | 32 | 36 | 31 | 34 |
| Tack Free Time | 46 | 42 | 46 | 40 | 44 |
| End of rise | 80 | 65 | 75 | 60 | 75 |
| Core density kg/m³ | 32 | 34 | 32 | 34 | 34 |
| 10% compressive strength KPa | 296 | 279 | 265 | 220 | 223 |
| Dimensional stability (% change in length and width, 1 day) | 78 | 82 | 69 | 81 | 88 |
| −15 deg C. | −2 | −0.3 | −0.1 | 0.0 | −4 |
| +100 deg C. | +2 | +3 | +4 | +4 | +5 |

Chemical compositions are expressed in parts by weight.

Proprietary materials or abbreviations used in the formulations are listed below; names marked by asterik are trademarks.

| Name | Composition | Company |
|---|---|---|
| Catalyst SFC | N,N—dimethylcyclohexylamine | ICI |
| Surfactant B8406 | siloxane copolymerised with polyether | Goldschmidt Laboratories |
| Arcton* 11 | trichloromonofluoromethane | ICI |
| Suprasec* DNR | polymeric MDI | ICI |
| DMMP | dimethyl methylphosphonate | Stauffer/Tenneco |
| DBTDL | dibutyltin dilaurate | |

We claim:

1. A polyester polyol having an average hydroxyl value in the range 250 to 400 mg KOH/g which comprises the reaction product of (i) a polyhydric alkoxylated derivative which is itself a reaction product of a polyhydric alcohol of the general formula

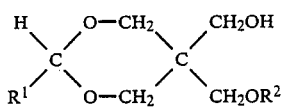

wherein $R^1$ is —H, —CH₃ or —OCH₃ and $R^2$ is —H, CH₂OH or CH₂C(CH₂OH)₃ with one or several alkylene oxides, and (ii) a polycarboxylic acid selected from the group consisting of dicarboxylic acids or ester of the formula ROOC (CH₂)$_n$ COOR or of the formula

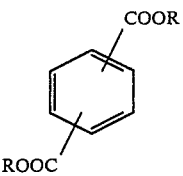

wherein n is 2 to 8 and R is hydrogen, methyl, ethyl, benzenetricarboxylic acid, polycarboxy substituted diphenyl or polyphenyls or the corresponding methyl esters.

2. A polyester polyol composition comprising a polyester polyol according to claim 1 which also contains at least 5% by weight of a reaction product selected from the group consisting of an alkoxylated polyhydric derivative of a compound of the formula

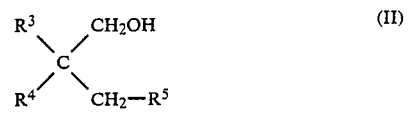

and the polyhydric compound of formula II wherein $R^3$ and $R^4$ are the same or different and are selected from the group consisting of —H, —CH₂OH and —CH₂OCH₃ provided that only one of $R^3$ or $R^4$ may be CH₂OCH₃, and $R^5$ is —OH, —CH₂OH or —OCH₂C(CH₂OH)₃ with a polycarboxylic acid as defined in claim 1.

3. A polyester polyol composition comprising at least 10 percent by weight of a polyester polyol according to claim 1.

4. A polyester polyol composition according to claim 2 comprising at least 10 percent by weight of a polyester polyol and at least 5 percent by weight of an alkoxylated polyhydric derivative of a compound of the formula (II) or a mixture thereof.

5. A polyester polyol composition according to any one of the claims 1 to 4 in which the alkoxylated derivatives are propoxylated derivatives.

6. A polyester polyol according to claim 1 in which the polyhydric alkoxylated derivative has an average hydroxyl value in the range of 490 to 575 mg KOH/g.

7. A polyester polyol according to any one of the claims 1 to 4 in which the weight average functionality is in the range of 2.3 to 5.0.

8. A polyester polyol composition comprising a polyester polyol according to claim 1 in which there is also present from 5 to 95 percent by weight of a hydroxy-terminated polyether, polyester or polyester amide.

9. A polyester polyol composition according to claim 2 in which the alkoxylated polyhydric derivative of a compound of the formula (II) has an average hydroxyl value in the range of 490 to 575 mg KOH/g.

* * * * *